United States Patent [19]
Hoffmann

[11] 3,820,313
[45] June 28, 1974

[54] GRASS CATCHER ASSEMBLY
[75] Inventor: Ralph L. Hoffmann, St. Louis, Mo.
[73] Assignee: The Perfection Manufacturing Company, St. Louis, Mo.
[22] Filed: Oct. 24, 1972
[21] Appl. No.: 299,843

[52] U.S. Cl. .............................................. 56/202
[51] Int. Cl. ........................................... A01d 53/06
[58] Field of Search .................................. 56/202

[56] References Cited
UNITED STATES PATENTS

| | | | |
|---|---|---|---|
| 2,783,604 | 3/1957 | Cahill, Jr. | 56/202 |
| 2,970,421 | 2/1961 | Krewson | 56/202 |
| 3,014,330 | 12/1961 | Oberdick | 56/202 X |
| 3,099,123 | 7/1963 | Price | 56/202 |
| 3,503,192 | 3/1970 | Berg et al. | 56/202 |
| 3,553,947 | 1/1971 | Root | 56/202 |
| 3,624,699 | 11/1971 | Hoffmann | 56/202 |

FOREIGN PATENTS OR APPLICATIONS

| | | | |
|---|---|---|---|
| 282,007 | 3/1966 | Australia | 56/202 |

*Primary Examiner*—Robert Peshock
*Assistant Examiner*—James A. Oliff

[57] ABSTRACT

The grass catcher assembly includes an adaptor plate attached to the lawn mower housing above the discharge orifice, the plate having a base portion and an inwardly formed lip overhanging the base portion to provide a hook. The catcher bag frame includes a rigid, projecting loop engageable with the hook to support said catcher bag frame. The loop is attached to the outwardly extending, bag supporting portion of the frame so as to provide spaced points of support transferring the weight of the catcher bag to the lawn mower housing. The adaptor plate includes spaced side abutment portions cooperating with the loop to preclude sideways movement between the loop and the adaptor plate.

2 Claims, 8 Drawing Figures

3,820,313

GRASS CATCHER ASSEMBLY

BACKGROUND OF THE INVENTION

This invention relates generally to a grass catcher bag assembly, and more particularly to an assembly utilizing an adaptor plate to attach the frame of the bag above the discharge chute of a rotary lawn mower housing.

Grass catcher attachments are common, optional equipment items for rotary lawn mowers. In some instances adaptor plates, attachable to the housing, have been used to provide the necessary attachment means for the catcher bag.

Several important features must be considered in order to provide an effective catcher bag assembly, particularly when an adaptor plate is used as part of the assembly. For example, the connection must be strong; it must be secure against movement, and it must be easily attachable to the lawn mower housing. Importantly, it must be sufficiently simple in construction to insure that it is inexpensive to manufacture. The present attachment provides all of these features in a manner not disclosed by known prior art assemblies.

SUMMARY OF THE INVENTION

This grass catcher assembly utilizes an adaptor plate suitable for attachment to the housing of a lawn mower after the housing has been formed. The structural arrangement of the frame of the grass catcher bag provides a projecting, rigid loop and the adaptor plate includes an overhanging, inwardly directed lip providing a hook engageable by the loop.

The weight of the catcher bag is transferred to the mower housing at the point of engagement of the loop and hook, and at a point spaced from said engagement point, to provide a strong couple connection and, in addition, the loop is integrated into the catcher bag frame.

The adaptor plate includes spaced abutments, engageable by the loop to preclude side movement of the frame, and cooperating with the hook and the other parts of the frame to preclude inward and outward movement of said frame.

The frame can be hooked into place with a single easy movement and the construction of the frame and the adaptor plate renders the assembly not only efficient in operation but also relatively inexpensive to manufacture.

It is an object of the invention to provide a grass catcher assembly including an adaptor plate having a base portion attached to the housing above the discharge orifice, and an inwardly directed, overhanging portion spaced from said housing to receive a projecting hoop portion of the catcher bag framing means in hooked relation.

It is another object to provide a catcher bag framing means, which includes an outwardly extending portion supporting the catcher bag, and a projecting loop portion providing a couple connection of the framing means to the housing, said loop portion underlying and operatively engaging the overhanging portion of the adaptor plate.

It is a further object to provide an adaptor plate having a base portion providing spaced abutment faces engageable with associated arms of the loop portion to preclude sideways movement and inward and outward movement of the framing means.

It is an important object to provide a species of the invention, in which the loop portion is provided by an elongate U-shaped element having extending arms attached to the outwardly extending portion of the framing means in fixed relation and a bight portion projecting beyond the open end of the catcher bag inwardly of the housing to provide a loop, said loop and said extending portion of the framing means cooperating to provide couple support transferring the weight of catcher bag to the lawn mower housing.

It is another important object to provide a second species, in which the outwardly extending portion of the framing means includes spaced, depending elements, and the loop portion of the framing means is provided by an orifice framing member attached to said spaced depending elements in couple relation and having a U-shaped element attached to the upper portion of the framing member to provide said loop, said loop and said framing member cooperating to provide couple support transferring the weight of the catcher bag to the lawn mower housing.

Figure 1:
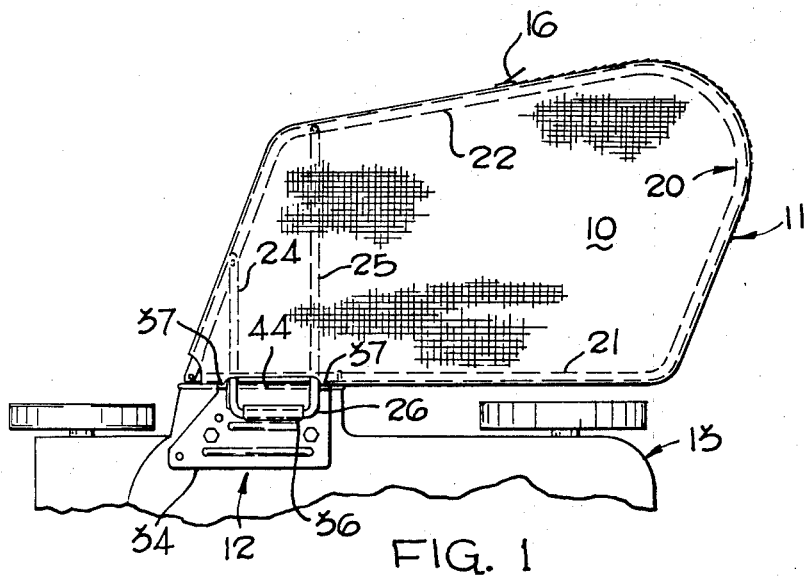
FIG. 1 is a plan view illustrating the catcher bag assembly mounted to a rotary lawn mower.
Figure 2:
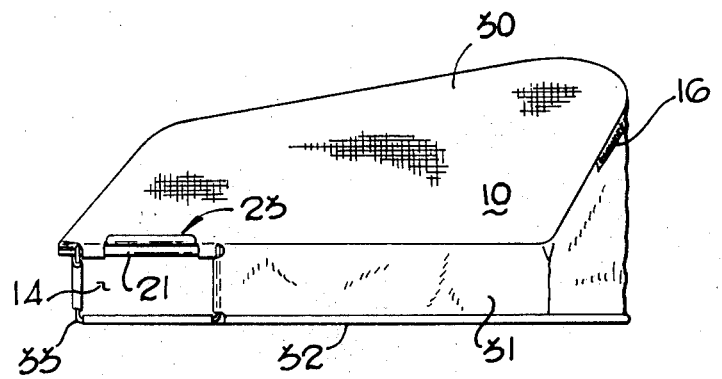
FIG. 2 is a front elevational view of the catcher bag and frame.

DESCRIPTION OF THE PREFERRED EMBODIMENT:

Referring now by characters of reference to the drawings, and first to FIGS. 1 through 4 it will be understood that the grass catcher assembly includes a catcher bag 10 supported by a frame, generally indicated by numeral 11, which is mounted by means of an adaptor plate 12 to the housing 13 of a rotary lawn mower. The attachment between the frame 11 and the adaptor plate 12 is such that the open end of the bag, indicated by numeral 14 in FIG. 2, is adjacently disposed of the discharge chute orifice 15. The catcher bag 10 includes a zippered opening 16 to facilitate discharge of the contents of said bag.

More specifically, the frame 11, which constitutes a framing means, includes a continuous upper framing member 20 having an inner portion 21 and an inclined, generally U-shaped, outer portion 22. The framing member 20 constitutes a first, outwardly extending support means. The frame 11 also includes an elongate U- shaped member 23, constituting a second support means providing a loop means, by which the framing member 20 is connected to the adaptor plate 12. The U-shaped member 23 includes opposed outwardly inclined arms 24 and 25 and an integrally formed end closure loop 26. The inclined arms 24 and 25 extend between and are connected to the inner and outer portions 21 and 22 of the continuous framing member 20 as by riveting. The inclined arms 24 and 25 provide a support means, which in effect carries the framing member 20 and the attached bag 10 in suspended relation.

In the preferred embodiment, the catcher bag 10 includes an upper portion 30 and depending side portions, generally indicated by numeral 31, of nylon mesh or similar material. The lower portion of the bag 10, which is generally indicated by numeral 32, is formed from sheet material, such as aluminum, and is rolled at its margins to provide a connection with the rod-reinforced lower margins of the depending side portion 31.

Figure 3:
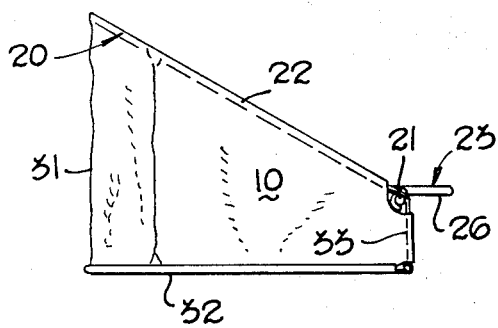
FIG. 3 is a side elevational view of the catcher bag and frame.
Figure 4:
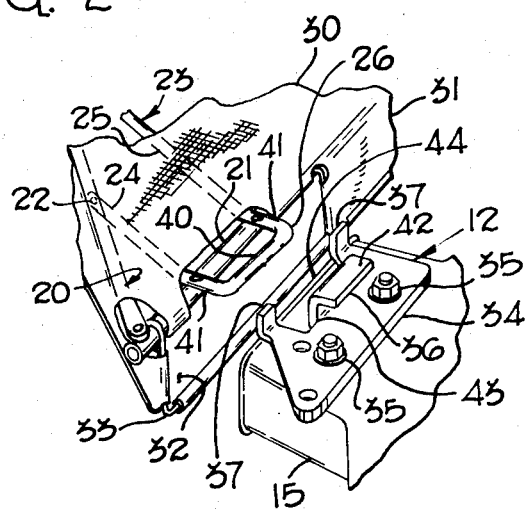
FIG. 4 is a fragmentary view in exploded perspective illustrating the disposition of the frame and adaptor plate prior to connection.
Figure 5:
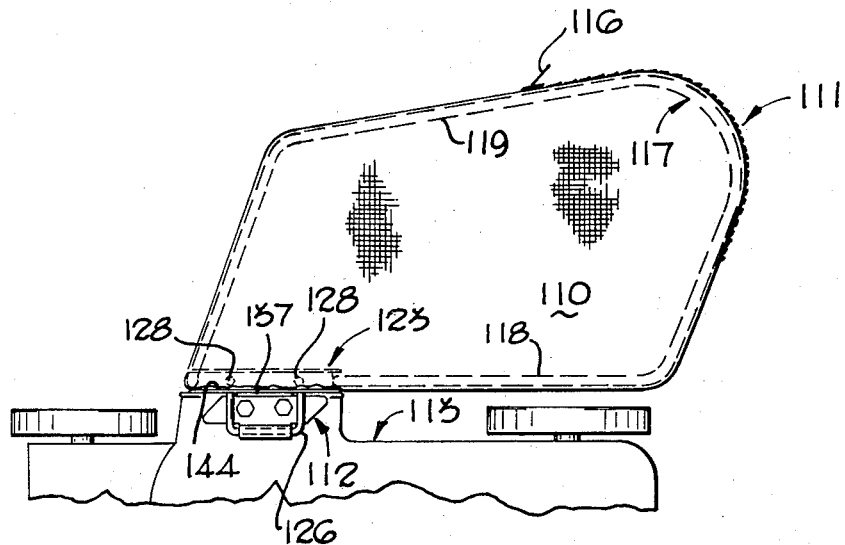
FIG. 5 is a plan view of a modified construction of the catcher bag assembly mounted to a rotary lawn mower.

The catcher bag open end 14 is defined by a depending U-shaped element 33, preferably formed from rod stock, and having ends which are wrapped around the inner element 21 of the upper framing member 20 as shown in FIG. 3. At the open end of the catcher bag, the upper portion 30, and side portion 31 are attached to the inner element 21 and the vertical legs of the U-shaped element 33 respectively. The lower portion 32 is wrapped around the bight of said U-shaped element, as clearly shown in FIG. 4.

The loop 26 provides the means by which the frame 11, and hence the catcher bag support assembly as a whole, is mounted to the lawn mower housing 13 above the discharge chute orifice 15. To effectuate the mounting of said frame 11 the adaptor plate 12 includes a base portion 34, attached to the housing as by bolts 35; an inverted L-shaped lug 36 and a pair of upwardly projecting lugs 37, constituting abutment means. The mounting of the frame 11 to the housing is accomplished by hooking the bight 40 of the loop 26 under the overhanging portion 42 of the L-shaped lug 36, which provides a hook means. In the preferred embodiment the adaptor plate 12 is mounted to the housing 13 so that the inner element 21 of the frame 11 is disposed in bearing engagement against the upper margin 44 of the discharge chute orifice 15 or with the lugs 37, depending on the disposition of said lugs. It will be understood that the weight of the catcher bag assembly acting downwardly tends to pivot in the vicinity of said margin 44 and move the bight 40 upwardly. This upward movement is prevented by engagement of said bight 40 with the overhanging portion 42 of the L-shaped lug. With this structural arrangement of parts the frame 11 is securely mounted to the lawn mower housing and movement of the frame is resisted by couple action. In addition, sideways movement of the frame 11 is precluded by lugs 37, which are engageable by the side arms 41 of the loop 26. Fore and aft movement of the frame 11 is precluded by engagement between the loop bight 40 and the upwardly extending portion 43 of the L-shaped lug, and by engagement between the frame inner element 21 and the upper margin 44 of the discharge chute orifice 15.

FIGS. 5 through 8 represent a modification of the grass catcher assembly. In this embodiment the catcher bag 110 is supported by a frame generally indicated by numeral 111, which is mounted by means of an adaptor plate 112 to a lawn mower housing 113, so that the open end 114 of the bag 110 is disposed adjacently of the discharge chute orifice 115. As with the previous embodiment access to the catcher bag is afforded by means of a zippered opening 116.

Figures 6, 7:
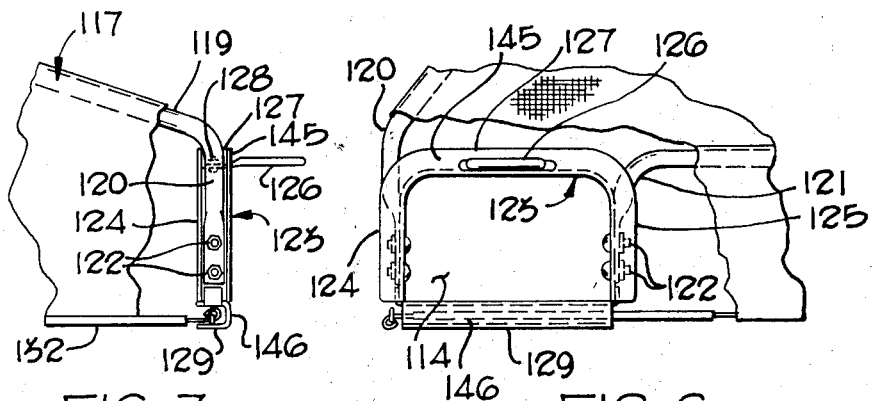
FIG. 6 is a fragmentary front elevational view of said modified construction, broken away to illustrate the framing of the open end of the catcher bag.
FIG. 7 is a fragmentary side elevational view of said modified construction, broken away to illustrate said open end framing.
Figure 8:
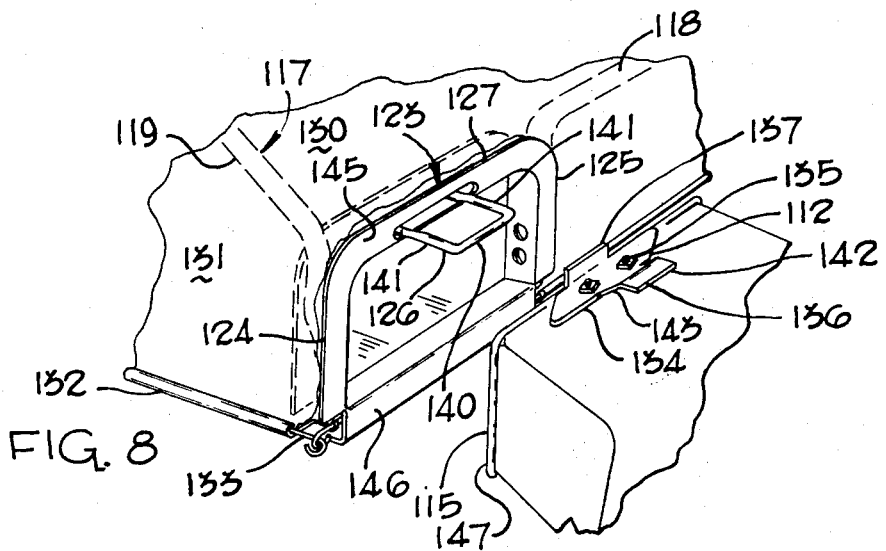
FIG. 8 is a fragmentary view of said modified construction, in exploded perspective, illustrating the frame and adaptor plate prior to connection.

The catcher bag frame 111, which constitutes a framing means, includes an upper framing member 117 having an inner portion 118, and a generally U-shaped, inclined outer portion 119. The ends of the frame 117, in the vicinity of the catcher bag open end 114, are formed into downwardly depending portions 120 and 121. The framing member 117 constitutes an outwardly extending support means. The frame 111 also includes a channel-shaped framing member 123, constituting a second support means providing a loop means, by which the framing member 117 is connected to the adaptor plate 112. As shown in FIG. 6 the ends 120 and 121 of the framing member 117 are attached at spaced points, as by bolts 122, to the legs 124 and 125 of the framing member 123 to provide a couple connection. The framing member 123 includes a U-shaped loop 126, which is connected to the upper element 127 of said member, through the slotted front flange 145, by means of bolts 128. The legs of the member 123 are connected at their lower end by means of a channel-shaped element 129, which is attached to said legs 124 and 125 as by welding.

As in the above described embodiment the bag 110 includes an upper portion 130; depending side portion 131, of nylon mesh or similar material, and a lower portion generally indicated by numeral 132 of sheet metal connected to the margins of said side portions, said margins being reinforced with rods such as that indicated by numeral 133.

The loop 126 provides the means by which the frame 111 is mounted to the lawn mower housing 113 above the discharge chute orifice 115. To effectuate the mounting, the adaptor plate 112 includes a base portion 134, attached to the housing 113, as by bolts 135, and lug 136, which provides a hook means having an upwardly extending inclined portion 143 and an overhanging portion 142. At its front end, substantially aligned with the margin 144 of the discharge orifice 115, the adaptor plate 112 includes a substantially vertical lug 137 constituting an abutment means. The loop 126 projects a distance from the front flange 145 of the framing member 123, so that when the loop 126 is hooked around the lug 136, the lug 137 is in bearing engagement with said flange 145. As with the previous embodiment the tendency of the bight 140 of the loop 126 to move upwardly, which is caused by the weight of the bag, results in the loop bight 140 engaging the lug overhanging portion 142. The engagement between flange 145 and the lug 137, and between the bight 140 and the inclined leg 143, precludes fore and aft movement of the frame 111. In addition, engagement between the side arms 141 and the ends of the lug 137 precludes sideways movement. Importantly, when the framing member 123 is mounted to the housing 113, the front flange 146 of the lower element 129 engages the lower portion 147 of the housing 113 adjacent the discharge orifice 115. This engagement provides a point of support between the frame 111 and the housing 113 which is spaced from the point of support provided by the loop bight 140 and the lug overhanging portion 142 and the tendency of the assembly to rotate under the weight of the bag is therefore resisted by couple action.

I claim as my invention:

1. A grass catcher bag assembly for attachment to the discharge orifice of a lawn mower housing, the assembly comprising:
   a. an adaptor plate adapted to be attached to the lawn mower housing above the discharge orifice, and including:
      1. a base portion, and
      2. hook means including an overhanging portion directed inwardly away from the orifice,
   b. a catcher bag including an open end and an outwardly extending portion,
   c. framing means including:
      1. a first support means, and
      2. a second support means attached to the first support means,
   d. the first support means being substantially circumferential and including tubular inner and outer portions disposed within the catcher bag, the outer portion supporting the outwardly extending portion of said bag and the inner portion having a substantially straight configuration, and
   e. said second support means including opposed elongate elements, interconnected by a U-shaped element having a bight and spaced arms integrally formed with said elongate elements to provide a loop means, each of said elongate elements extending between and being connected to said inner and outer portions of said second support means in couple relation and said loop means extending beyond said inner portion for engagement with the overhanging portion of the hook means to substantially preclude upward movement of said loop means.

2. An assembly as defined in claim 1, in which:
   f. the adaptor plate includes lateral abutment means forwardly spaced from the hook means and engageable with associated arms of the U-shaped element to substantially preclude sideways and turning movement of the first support means.

* * * * *